Feb. 1, 1955. F. GARDUNO 2,700,820
UNSEAMER
Filed Jan. 24, 1952
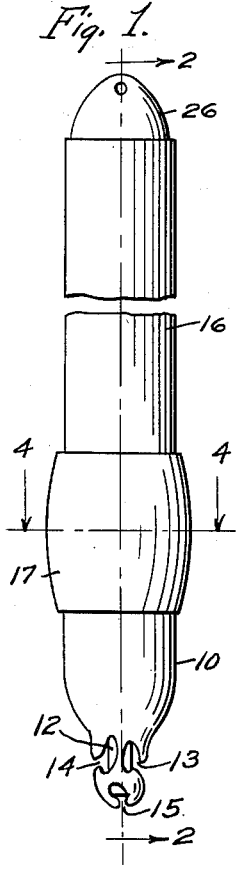
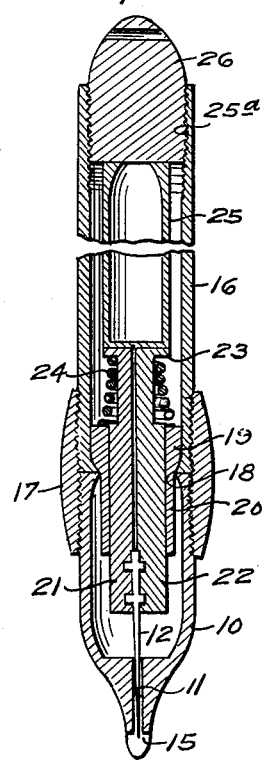
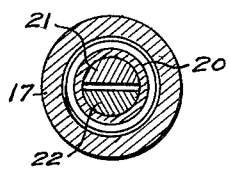
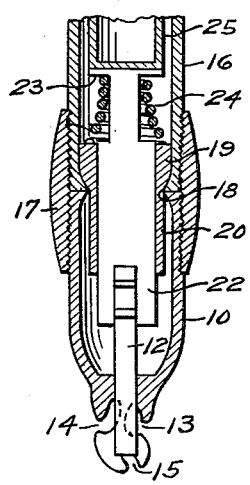
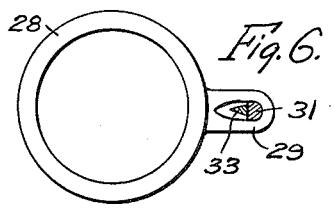
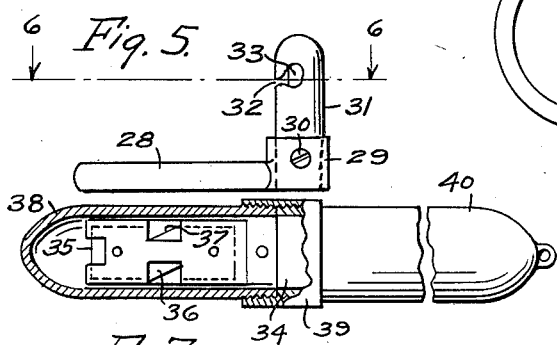
INVENTOR.
Fernando Garduno
BY Victor J. Evans & Co.
ATTORNEYS

2,700,820

United States Patent Office

Patented Feb. 1, 1955

2,700,820

UNSEAMER

Fernando Garduno, Los Angeles, Calif.

Application January 24, 1952, Serial No. 267,990

3 Claims. (Cl. 30—286)

This invention relates to thread cutting devices, and in particular an instrument having a blade slidably mounted in a tubular handle with the blade actuated by a button at one end and with the sharp end of the blade positioned to extend through thread receiving passages or notches in the sides and end of the holder whereby with the blade in the operative position the thread of a seam may be cut as the instrument is moved between the pieces of material stitched together with the thread.

The purpose of this invention is to provide means for cutting threads in a seam without cutting the material stitched together by the thread.

Various types of thread cutting implements have been provided, however, with the conventional type of thread cutter considerable skill is required to cut the thread without damaging the material. With this thought in mind this invention contemplates a device having a comparatively small head in which the head may be forced down a seam so that a knife incorporated in the head may cut threads of the seam without coming in contact with the material.

The object of this invention is, therefore, to provide means for forming a thread cutting device whereby a thread cutting knife is substantially surrounded with material of a holder whereby threads entering recesses in the holder may be cut without cutting elements coming into contact with material held by the threads.

Another object of the invention is to provide a thread cutting implement having a knife slidably mounted therein in which the knife may be extended beyond the end of the implement for starting the cutting operation.

A further object of the invention is to provide an improved thread cutting device for cutting threads in seams which is of a simple and economical construction.

With these and other objects and advantages in view the invention embodies a tubular holder secured to the end of a tubular casing with a coupling member in which a head with notches in the sides and end is provided on the end of the holder and in which a cutting blade slidably mounted in the holder is carried by a mounting member slidably mounted in the casing and which is actuated to retract the blade with a spring and actuated to extend the blade with a button threaded in the opposite end of the casing.

Other features and advantages of the invention will appear from the following description taken in connection with the drawing, wherein:

Figure 1 is a side elevational view of the improved thread cutting implement showing the blade in the operative position and showing part of the casing broken away.

Figure 2 is a vertical section through the implement illustrating the parts in the position as shown in Fig. 1, said section being taken on line 2—2 of Fig. 1.

Figure 3 is a similar section showing the lower part of the implement said section being taken from a point at a right angle to that shown in Fig. 2.

Figure 4 is a cross section through the implement taken on line 4—4 of Fig. 1.

Figure 5 is a side elevational view illustrating the modification wherein a thread cutting blade is provided in a projection at one side of a finger ring.

Figure 6 is a sectional plan taken on line 6—6 of Fig. 5 showing the cutter and ring of Fig. 5.

Figure 7 is a further modification in which a removable cap is positioned over the blade holding head of the implement.

Referring now to the drawing wherein like reference characters denote corresponding parts the improved thread cutting implement of this invention includes a holder 10 having a slot 11 extended through the lower end through which a cutting blade 12 extends and, the extended end of the holder is provided with a head having thread receiving notches 13 and 14 in the sides and a similar notch 15 in the end.

The holder 10 is attached to the end of a tubular casing 16 with a coupling member 17 and the meeting edges of the holder and casing are rolled inwardly as shown at the point 18 in Fig. 2.

A bushing 19 having a sleeve 20 extended from the lower end is slidably mounted in the casing 16 with the sleeve extended into the holder 10 and substantially semi-circular sections 21 and 22 are slidably mounted in the bore of the bushing. Annular flanges 23 are provided on the upper ends of the sections and a spring 24 positioned around the sections 21 and 22 bears against the under surface of the flange 23 at the upper end. The lower enlarged end rests upon the bushing 19.

An extra blade holding reservoir 25 is positioned on the flange 23 and extends upwardly to the lower end of the button 26 which is threaded in the upper end of the casing 16 with threads 25a.

With the parts as illustrated in Fig. 2 the cutting end of the blade or knife 12 is in operative position in the notches 13, 14 and 15, as shown in Fig. 3 and when it is desired to start the operation of the device the button 26 is screwed inwardly forcing the reservoir 25, sections 21 and 22 and knife 12 downwardly wherein the end of the knife extends beyond the head at the end of the holder. With the knife in this position the cutting operation of threads of a seam may be started. After the cutting of the threads is started the button 26 is unscrewed and the spring 24 returns the knife through the sections 21 and 22 to the position shown in the drawing.

In the design illustrated in Figs. 5 and 6 a ring 28 is provided with a hub 29 in which a set screw 30 holds a casing 31, the upper part of which is provided with a notch 32 in which a knife 33 is positioned. With the knife mounted in this manner it may be run along a seam to cut the threads without cutting the material secured together by the threads.

In the design illustrated in Fig. 7 a bushing 34 provides means for mounting a plate 35 so that the cutting edge of the blade extends into notches 36 and 37 of a blade holder similar to that shown in Figs. 1 and 2 and in this design the implement is provided with a cap 38 that is secured by a coupling member 39, similar to the member 17, to a tubular casing or handle 40.

With the implement formed in either of the designs illustrated the head or part in which the knife is positioned may be forced into a seam and held so that threads of the seam pass into one of the notches, thereby contacting the knife or cutting blade in the holder. As the device is moved along the seam the threads are cut by the blade.

It will be understood that other modifications may be made in the design and arrangement of the parts without departing from the spirit of the invention.

What is claimed is:

1. A thread cutter comprising a tubular handle having a tapered arcuate lower end with a centrally positioned blade slot extended through said lower end and with thread receiving notches in the sides and end of the said lower end and communicating with the said blade slot, a blade having cutting edges on the sides and on one end thereof, a blade holder positioned in the said handle and longitudinally slidable therein, means clamping a blade in said holder with the blade extended into the said blade slot in the lower end of the handle, a cap adjustably mounted in the upper end of the handle, and means connecting the cap to the blade holder whereby inward movement of the cap actuates the blade through the said blade slot and with the end of the blade projecting from the tapering end of the handle.

2. A thread cutter comprising a tubular handle having a tapered arcuate lower end with a centrally positioned blade slot extended through said lower end and with thread receiving notches in the sides and end of the said lower end and communicating with the said blade slot, a blade having cutting edges on the sides and on one end thereof, a blade holder positioned in the said handle and longitudinally slidable therein, means clamping a blade in said holder with the blade extended into the said blade slot in the lower end of the handle, a cap adjustably mounted in the upper end of the handle, means connecting the cap to the blade holder whereby inward movement of the cap actuates the blade through the said blade slot with the end of the blade projecting from the tapering end of the handle, and resilient means in the handle for withdrawing the blade as the cap is actuated outwardly.

3. A thread cutter comprising a tubular handle having a tapered arcuate lower end with a centrally positioned blade slot extended through said lower end and with thread receiving notches in the sides and end of the said lower end and communicating with the said blade slot, a blade having cutting edges on the sides and on one end thereof, a split blade holder positioned in the said handle and longitudinally slidable therein, means clamping a blade in said holder with the blade extended into the said blade slot in the lower end of the handle, a cap adjustably mounted in the upper end of the handle, means connecting the cap to the blade holder whereby inward movement of the cap actuates the blade through the said blade slot with the end of the blade projecting from the tapering end of the handle, and resilient means in the handle for withdrawing the blade as the cap is actuated outwardly.

References Cited in the file of this patent

UNITED STATES PATENTS

| Number | Name | Date |
|---|---|---|
| Re. 2,520 | Merritt | Mar. 19, 1867 |
| 985,531 | Kunde | Feb. 28, 1911 |
| 1,095,606 | Trafford | May 5, 1914 |
| 1,129,310 | Platt | Feb. 23, 1915 |
| 1,406,156 | Cotter et al. | Feb. 7, 1922 |
| 1,541,624 | Chute | June 9, 1925 |
| 2,483,750 | Bratrud | Oct. 4, 1949 |